United States Patent
Kinsman et al.

(10) Patent No.: US 11,499,281 B2
(45) Date of Patent: Nov. 15, 2022

(54) BIOCHAR CONTAINMENT BOOM AND BLANKET

(71) Applicant: Orin Technologies, LLC, Verona, WI (US)

(72) Inventors: Larry Kinsman, Verona, WI (US); Adam Mohs, Fargo, ND (US)

(73) Assignee: Orin Technologies, LLC, Verona, WI (US)

(*) Notice: Subject to any disclaimer, the term of this patent is extended or adjusted under 35 U.S.C. 154(b) by 0 days.

(21) Appl. No.: 17/068,507

(22) Filed: Oct. 12, 2020

(65) Prior Publication Data

US 2021/0108386 A1 Apr. 15, 2021

Related U.S. Application Data

(60) Provisional application No. 62/913,311, filed on Oct. 10, 2019.

(51) Int. Cl.
*E02B 15/06* (2006.01)
*E02B 15/08* (2006.01)
*E02B 15/10* (2006.01)

(52) U.S. Cl.
CPC .......... *E02B 15/0857* (2013.01); *E02B 15/06* (2013.01); *E02B 15/0814* (2013.01); *E02B 15/10* (2013.01)

(58) Field of Classification Search
CPC .......... E02B 15/04; E02B 15/06; E02B 15/08; E02B 15/0807; E02B 15/0814; E02B 15/0857; E02B 15/0885; E02B 15/0892
See application file for complete search history.

(56) References Cited

U.S. PATENT DOCUMENTS

| | | | | |
|---|---|---|---|---|
| 3,831,760 A | * | 8/1974 | Economy | E02B 15/06 210/242.4 |
| 5,227,072 A | * | 7/1993 | Brinkley | B01D 17/00 210/671 |
| 5,480,261 A | * | 1/1996 | Meyers | E02B 15/08 405/63 |
| 9,561,530 B1 | * | 2/2017 | Kinsman | C02F 1/705 |
| 2005/0058509 A1 | * | 3/2005 | Steinberg | E02B 3/064 405/34 |
| 2006/0140723 A1 | * | 6/2006 | DeAngelis | E03F 5/0404 405/63 |

(Continued)

FOREIGN PATENT DOCUMENTS

RU 200395 U1 * 10/2020

*Primary Examiner* — Frederick L Lagman
(74) *Attorney, Agent, or Firm* — Boyle Fredrickson, S.C.

(57) ABSTRACT

A water remediation device is disclosed, including a water-permeable outer fabric defining a cavity therein, a buoyant core disposed within the cavity, and a mass of water remediation media including biochar disposed between the buoyant core and the water-permeable outer fabric. The remediation media is configured to reduce a quantity of a polyfluoroalkyl substance present in a sample of contaminated water when the remediation device is placed in the sample of contaminated water. The device may be formed into an elongated boom that is configured to float on or partially-submerge in water. Alternatively, the device may be formed of a pad or blanket that may be entirely submerged in water during use.

17 Claims, 1 Drawing Sheet

(56) References Cited

U.S. PATENT DOCUMENTS

2006/0191835 A1* 8/2006 Petrik ................. B01J 20/20
                                                    210/242.4
2012/0003045 A1* 1/2012 Singleton ............ E02B 15/0885
                                                       405/63

* cited by examiner

BIOCHAR CONTAINMENT BOOM AND BLANKET

CROSS-REFERENCE TO RELATED APPLICATIONS

This application claims priority to U.S. provisional patent application Ser. No. 62/913,311, filed Oct. 10, 2019, the entire contents of which is incorporated herein by reference.

BACKGROUND OF THE INVENTION

1. Technical Field

The present invention related to a boom provided for containing, collecting and remediating waterborne pollutants, and more particularly a biochar containing boom. A method of remediating water through the use of a biochar containing boom is also provided herein.

2. Background Art

The present invention relates to a boom for containing and collecting pollutants within and on the surface of water, such as reservoirs, rivers, lakes and the like. The present invention is especially well suited for the treatment of surface water suffering from land-based runoff pollutants, fertilizers, wastewater treatment overload runoff, groundwater and aquafer contamination, or oil contamination, where it often occurs that pollutants escape by accident on to the water from boats, residential landowners, agricultural sources, or industrial sources. In order to prevent such escaped pollution from spreading and causing damage to beaches, shorelines, marine life, birds, etc. it is important to be able to gather pollutants and preferably prevent their release or reintroduction, via remediation.

Generally, prior boom construction comprises continuous rails of flexible material durable for use in water, which have secured thereon at the upper edge or on the side reinforcing floating means. When used in deep water applications such as seas and oceans the lower edge are often provided with ballast. Such booms are also known to comprise plate elements of wood, metal or another material enclosed in sleeves and connected to marking floats and an underlying ballast. Accordingly, there is still a need for a device that it is configured for use in active water remediation.

SUMMARY OF THE INVENTION

In one embodiment, the current boom is configured to be affixed to the rear of a watercraft during movement as to be pulled through the water and increase exposure to the surface area of the water source and pollutants thereon to undergo active collection and/or remediation of pollutants.

In another object of the invention, the boom may have a generally flat configuration, akin to a blanket or pad, which is configured to further increase surface area contact with the water as the boom travels behind a watercraft.

Another object of this invention is to provide a new and improved method of and apparatus for improving the water quality of a water source.

One object of this invention is to provide a new and improved method of and apparatus for reducing the per- or polyfluoroalkyl chemical (PFC) concentration in water drawn from a water source.

One object of this invention is to provide a new and improved method of and apparatus for reducing the bacteria (coliform) count in water drawn from a water source.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE INVENTION

Figure 1:
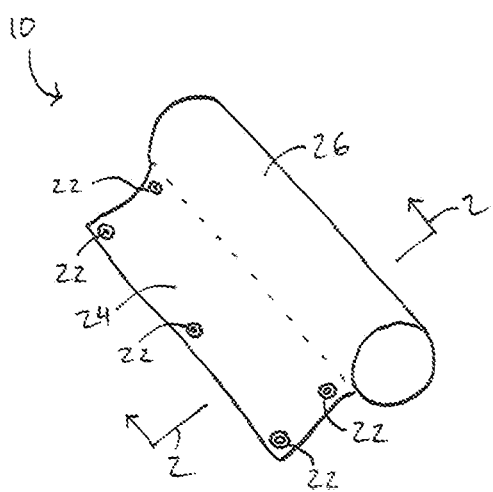
FIG. 1 is an isometric view of a biochar containing boom according to one embodiment of the present invention.
Figure 2:
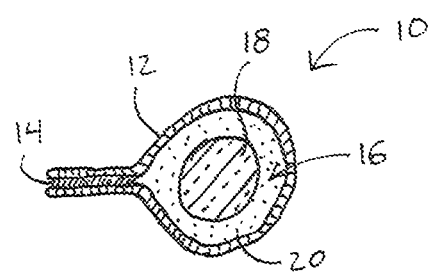
FIG. 2 is a cross sectional view of the biochar containing boom of FIG. 1 taken along the line 2-2.

Referring now to FIGS. 1 and 2, in accordance with an aspect of the invention, a containment boom 10 is shown. The boom 10 comprises an outer fabric 12 that is water permeable and exhibits sufficient tensile strength as to allow the boom 10 to be selectively anchored in a fixed location or dragged behind a moving watercraft. In of embodiment, the fabric 12 is a semi-porous nonwoven material. In yet another embodiment the nonwoven material of the fabric 12 has a weight of approximately 10 ounces per square yard or more. However, it should be understood that the present invention is not so limited and that any type of water permeable textile or fabric 12 is considered well within the scope of the present invention. As shown in FIG. 2, the fabric 12 is folded about itself such that opposing first and second ends of the fabric overly one another and are affixed to one another by a water resistant adhesive 14 that is formulated for use with the fabric 12. The central portion of the fabric 12 is devoid of adhesive 14, thereby forming a central cavity 16, that is generally tubular in shape. The cavity 16 receives a buoyant core 18 disposed about the longitudinal axis of the cavity 16. In one embodiment, the buoyant core 18 is formed of a foam flotation, for example an elongated tube of polystyrene. A remediation media 20 is then disposed between the outer wall formed of fabric 12 and the inner flotation core 18 within the cavity 16. The ends of the cavity 16 may be synched, sewn, or adhesively sealed.

In one embodiment of the present invention, the remediation media 20 composes in part a mass of biochar. As an alternative to activated charcoal, biochar has been shown to be an effective remediation media for the treatment for various contaminants such as agricultural runoff containing nitrates, phosphates, and ammonia, mine drainage and tailings containing various heavy metals and low pH, municipal storm water, general heavy metals removal and general organic compounds. To this end, biochar has the potential to be an effective environmental remediation tool for the remediation of contaminated and/or polluted surface water, whether by itself, or in conjunction with other treatments such as, activated carbon, which may also be present in the remediation media 20.

The inventors have discovered that biochar can both offer surface water remediation benefits while maintaining effectiveness of the biochar as both an absorbent material, as well as an oxidation catalyst. Such biochar, i.e., biochar derived from biological sources and reduced to small particle size, may be may be used as a part of an remediation media composition and related method, which may further comprise zero valent metals (zvm), oxidation chemistries, reductive chemistries, biological inoculation consisting of nutrient systems and/or desired biological agents, additional a biomass products, or combinations thereof. In one embodiment of the present invention, a substantial portion of the biochar particles of the present invention have a particle diameter of preferably between 50 microns and 4000 microns, and more preferably between 50 microns and 400 microns. While these particle diameters are included herein as one embodiment of the present invention, it should be understood that the invention need not be limited to such dimensions. In one preferred embodiment, the biochar present in the remediation media 18 may include but is not limited to biochars formed from wood, grass, manure, grain husks, saw dust, etc. The biochars may be chars produced by conventional charring methods or, alternatively within the scope of this invention, the biochars may be produced with an additional activation step such as acid treatment, high pressure steam, etc. Furthermore, a carrier product or additional components by be disposed within remediation media 20 within cavity 18.

It is believed that the high surface area of the biochar component of the remediation media 20, as well as its molecular structure provides improved absorption of the organic contaminants relative to conventional activated charcoal. That is to say that the molecularly porous structure of biochar is configured to retain a larger volume of organic contaminants than is the relatively planner or flaky molecular structure of conventional activated carbon. Additionally, it is further believed that the abundance of carboxyl groups located on the surface of the biochar facilitates in immobilizing otherwise free moving contaminates from the polluted surface water. Resultantly, the biochar's concentration, i.e., adsorption, of organic contaminants such as hydrocarbons, even when such contaminants are present at low aqueous concentrations in the polluted surface water results in the concentration of the contaminants which increases the residence time of the organic contaminant in the vicinity of the free radical present in the remediation media 20. This concentration may reduce the required volume of oxidizing agent significantly, and particularly in applications with low aqueous contaminant concentrations. Furthermore, use of biochar in the remediation media 20 results in the formation of additional oxidative chemistries that facilitate in the oxidative treatment of PFAS/PFCs and PFC precursors present in contaminated water samples.

Returning now to FIG. 1, a series of fixation points 22, for example gromets may extend through the adhesively overlapped portion of the fabric 12, which forms a flap 24 that extends from the tubular portion 26. The fixation points 22 may allow the boom 10 to be tethered or otherwise affixed to a watercraft, such as a motorboat; in which case the boom will be dragged behind the boat to allow increased water flow through the fabric 12 and into contact with the remediation media 20 located within the cavity 16. The flap 24, which does not contain a buoyant core 18 may sink below the surface of the water during use, thereby scooping and directing water upward towards the remediation media 20 containing core 16 during use. Alternatively, the fixation points 22 may be used to anchor the boom 10 in a fixed location, i.e., adjacent a source of water runoff or the like. Still further, side mounted fixation points 22 may generally allow for various booms 10 to be strung together thereby creating an elongated series of booms 10.

In one embodiment, the fabric 12 of the boom 10 is a 5.0 foot square of fabric and the cavity 16 has a diameter of approximately 8.0 inches. In such a representative embodiment, approximately 5 to 25 pounds of remediation media 20 is configured to be receiving within the cavity 16 about the flotation core 18. However, it should be understood that other dimensions are also covered by the scope of the present invention.

Figure 3:
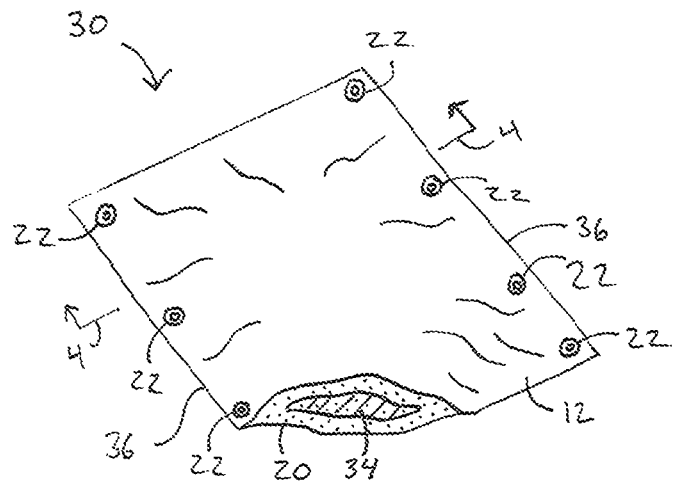
FIG. 3 is a partial cross sectional isometric view of another biochar containing boom according to an alternative embodiment of the present invention; and, FIG. 4 is a cross sectional view of the biochar containing boom of FIG. 3 takes along the line 4-4.
Figure 4:
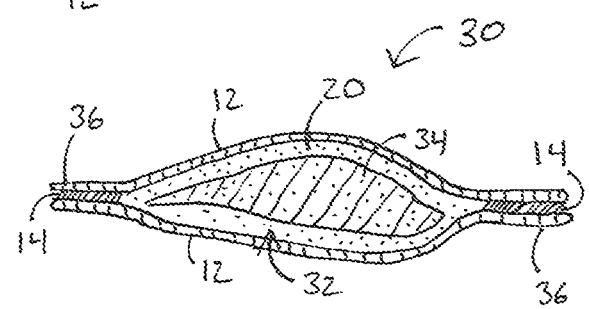

Turning now to FIGS. 3 and 4, the blanket 30 embodiment of the present invention is shown. Similar to the previously described boom 10, the blanket 30 is formed of two overlapping layers of fabric 12 that is adhesively affixed together about its edges by a water-resistant adhesive 14 that is formulated for use with fabric 12. The central portion of the fabric 12 is devoid of adhesive 14, thereby forming a central cavity 32. The cavity 32 received a batting material 34 to increase the volume of the cavity 32. In one embodiment, the batting material 34 is formed of a natural fiber material, for example coconut coir. Unlike the buoyant core 18 of the boom 10, the batting material 34 does not provide flotation to the blanket 30. However, it is considered within the scope of the present invention that a flotation core 18 could be added to the cavity 32. A remediation media 20, as was described above is then disposed between the outer wall formed of fabric 12 and the batting material 34 within the cavity 32. As shown in FIG. 4, due to the loose nature of the batting material 34, the remediation media 20 may become intermixed or infused throughout the batting material 34 within the cavity 32.

Returning now to FIG. 3, a series of fixation points 22, for example gromets may extend through the adhesively overlapped portions of the fabric 12 walls, generally about the perimeter 36 of the blanket 30. The fixation points 22 may allow the blanket 30 to be tethered or otherwise affixed to a watercraft, such as a motorboat; in which case the blanket 30 will be dragged behind the boat, while submerged to allow water flow through the fabric 12 and into contact with the remediation media 20 located within the cavity 32. Alternatively, the fixation points 22 may be used to anchor the blanket 30 in a fixed location, i.e., adjacent a source of water runoff, adjacent storm drains, or the like. Still further, side mounted fixation points 22 may generally allow for various blankets 30 to be strung together thereby creating an elongated series of blankets 30. Still further, various combinations of blankets 30 and booms 10 are well within the scope of the present invention.

Although the best mode contemplated for carrying out the present invention is disclosed above, practice of the above invention is not limited thereto. It will be manifest that various additions, modifications and rearrangements of the features of the present invention may be made without deviating from the spirit and the scope of the underlying inventive concept.

In one experimental trial of the remediation benefits of the present invention, a hollow tube or pipe having an approximate length of 8.0 inches and a diameter of 2.0 inches was filled with 1.0 lbs of biochar, as described above, and secured with a permeable membrane on opposing ends of the pipe. A sample of contaminated water was then pumped into and cycled through the vertical end of the pipe by a pump having an approximate capacity of 5 gallons per day, and the contaminated water travelled through the pipe under the force of gravity. In so doing, the biochar containing pipe represented the flow of contaminated water that would flow thorough the biochar 20 of the boom 10 or blanket 30 according to the present invention. Testing was performed on the contaminated water to identify the presence of per or polyfluoroalkyl substances (PFAS) in a control group, after 24 hours of treatment, i.e., 5 passes through the biochar, after 48 hours of treatment, i.e., 10 passes through the biochar, and after 7 days of treatment, i.e., 35 passes through the biochar. The quantities of PFAS in the tested samples, measured in nanograms per milliliter, and the percent reduction of PFAS are shown below in Tables 1 and 2 below. Where quantities of PFAS tested were less than the detectable threshold, the values are represented by the demarcation "ND" (not detected). Notable reduction in the presence of PFAS through the experimental laboratory test are indicative of the reduction of such HFAS that the boom 10 of the present invention will exhibit through the use of a biochar containing remediation media 20.

TABLE 1

| PFAS | Control (ng/mL) | 24 Hrs (ng/mL) | 48 Hrs (ng/mL) | 7 Days (ng/mL) |
| --- | --- | --- | --- | --- |
| Perfluorobutanoic | 22 | 15 | 7.2 | 1.4 |
| Perfluoropentanoic | 62 | 26 | 11 | 1.6 |
| Perfluorohexanoic | 59 | 22 | 9 | 1.2 |
| Perfluoroheptanoic | 34 | 13 | 4.7 | 0.59 |
| Perfluorooctanoic | 63 | 17 | 7.5 | 1 |
| Perfluorononanoic | 2.5 | 1.8 | 0.91 | |
| Perfluorobutanesulfonic | 3.7 | 1.1 | 0.45 | |
| Perfluoropentanesulfonic | 9.3 | 2.2 | 0.8 | |
| Perfluorohexanesulfonic | 240 | 49 | 20 | 2.2 |
| Perfluoroheptanesulfonic | 22 | 4 | 1.9 | 0.24 |
| Perfluorooctanesulfonic | 150 | 31 | 15 | 1.5 |
| 6:02 | 130 | 26 | 13 | |

| PFAS | Percent Reduction: 24 Hrs versus Control | Percent Reduction: 48 Hrs versus Control | Percent Reduction: 7 Days versus Control |
| --- | --- | --- | --- |
| Perfluorobutanoic | 32% | 67% | 94% |
| Perfluoropentanoic | 58% | 82% | 97% |
| Perfluorohexanoic | 63% | 85% | 98% |
| Perfluoroheptanoic | 62% | 86% | 98% |
| Perfluorooctanoic | 73% | 88% | 98% |
| Perfluorononanoic | 28% | 64% | 100% |
| Perfluorobutanesulfonic | 70% | 88% | 100% |
| Perfluoropentanesulfonic | 76% | 91% | 100% |
| Perfluorohexanesulfonic | 80% | 92% | 99% |
| Perfluoroheptanesulfonic | 82% | 91% | 99% |
| Perfluorooctanesulfonic | 79% | 90% | 99% |
| 6:02 | 80% | 90% | 100% |

TABLE 2

| | Control | | 7 Day | |
| --- | --- | --- | --- | --- |
| PFAS | Pre-Treatment (ng/mL) | Post-Treatment (ng/mL) | Pre-Treatment (ng/mL) | Post-Treatment (ng/mL) |
| Perfluorobutanoic | 23 | 60 | ND | 11 |
| Perfluoropentanoic | 59 | 120 | ND | ND |
| Perfluorohexanoic | 62 | 430 | ND | ND |
| Perfluoroheptanoic | 35 | 35 | ND | ND |
| Perfluorooctanoic | 63 | 60 | ND | ND |
| Perfluorononanoic | ND | ND | ND | ND |
| Perfluorodecanoic | ND | ND | ND | ND |
| Perfluoroundecanoic | ND | ND | ND | ND |
| Perfluorododecanoic | ND | ND | ND | ND |
| Perfluorotridecanoic | ND | ND | ND | ND |
| Perfluorotetradecanoic | ND | ND | ND | ND |
| Perfluorobutanesulfonic | ND | ND | ND | ND |
| Perfluoropentanesulfonic | 8.8 | 9.1 | ND | ND |
| Perfluorohexanesulfonic | 260 | 230 | ND | ND |
| Perfluoroheptanesulfonic | 21 | 20 | ND | ND |
| Perfluorooctanesulfonic | 150 | 130 | ND | ND |
| Perfluorononanesulfonic | ND | ND | ND | ND |
| Perfluorodecanesulfonic | ND | ND | ND | ND |
| Perfluorooctanesulfonamide | ND | ND | ND | ND |
| N-methylperfluorooctane-sulfonamidoacetic | ND | ND | ND | ND |
| N-ethylperfluorooctane-sulfonamidoacetic | ND | ND | ND | ND |
| 4:02 | ND | ND | ND | ND |
| 6:02 | 120 | ND | ND | ND |
| 8:02 | ND | ND | ND | ND |

We claim:

1. A water remediation boom, comprising:
   a first sheet of water-permeable outer fabric affixed to a second sheet of water-permeable outer fabric about a common parameter defining a central cavity within the common perimeter of the first and second sheets,
   a buoyant core disposed within the central cavity,
   a fibrous batting material disposed within the central cavity,
   a mass of water remediation media comprising biochar disposed between the buoyant core and the water-permeable outer fabric, wherein a portion of the remediation media is intermixed with the fibrous batting material; and wherein the remediation material is configured to reduce a quantity of a polyfluoroalkyl substance present in a body of contaminated water when the boom is placed in the body of contaminated water.

2. The water remediation boom of claim 1, wherein the water-permeable outer fabric is a semi-porous nonwoven material.

3. The water remediation boom of claim 2, wherein the water-permeable outer fabric has a weight of at least 10 ounces.

4. The water remediation boom of claim 1, wherein the buoyant core defines an elongated tube.

5. The water remediation boom of claim 4, wherein the elongated tube is formed of polystyrene.

6. The water remediation boom of claim 4, wherein the biochar is disposed about an outer surface of the elongated tube.

7. The water remediation boom of claim 4, wherein the boom further comprises a generally planer portion of the water-permeable outer fabric extending parallel to a longitudinal axis of the elongated tube, that is devoid of remediation media.

8. The water remediation boom of claim 7, wherein the boom further comprises plurality of grommets extending through a thickness of the generally planer portion of the water-permeable outer fabric.

9. The water remediation boom of claim 7, wherein the biochar has a particle diameter of between 50 and 400 microns.

10. The water remediation boom of claim 1, comprising a series of booms in Which a first grommet of a first boom is a fixed to a second grommet of a second boom.

11. The water remediation boom of claim 10, wherein the remediation media further comprises an additional material selected from the group of a zero valent metal, an oxidation chemistry, a reductive chemistry, and a biological inoculation.

12. The water remediation boom of claim 1, comprising a water-resistant adhesive between the first and second sheets at the common perimeter.

13. The water remediation boom of claim 1, wherein the fibrous batting material is a natural fibrous material.

14. The remediation boom of claim 1, wherein the boom further comprises a plurality of grommets extending through a thickness of the water-permeable outer fabric layer about the common perimeter of the first and second sheets.

15. The remediation boom of claim 14, wherein the boom is submerged under a surface of the contaminated water and anchored via the grommet.

16. The remediation boom of claim 14, wherein the boom is anchored via the plurality of grommets in a path of water flow.

17. The remediation boom of claim 1 wherein the fibrous batting material is disposed between the buoyant core and the water-permeable outer fabric within the central cavity.

* * * * *